United States Patent
Kennedy et al.

(10) Patent No.: US 7,581,706 B2
(45) Date of Patent: Sep. 1, 2009

(54) SHAPE MEMORY ALLOY (SMA) SYSTEM

(75) Inventors: Karl Kennedy, Fraser, MI (US); H. Winston Maue, Farmington Hills, MI (US); John F. Nathan, White Lake, MI (US)

(73) Assignee: Lear Corporation, Southfield, MI (US)

( * ) Notice: Subject to any disclaimer, the term of this patent is extended or adjusted under 35 U.S.C. 154(b) by 355 days.

(21) Appl. No.: 11/426,384

(22) Filed: Jun. 26, 2006

(65) Prior Publication Data

US 2008/0120976 A1 May 29, 2008

(51) Int. Cl.
*H01L 41/08* (2006.01)
(52) U.S. Cl. .................. 248/424; 248/429; 248/430; 700/1; 297/311; 297/312
(58) Field of Classification Search ........... 700/1; 248/424, 429, 430; 297/311, 312
See application file for complete search history.

(56) References Cited

U.S. PATENT DOCUMENTS

| | | | |
|---|---|---|---|
| 4,932,210 A | | 6/1990 | Julien et al. |
| 5,095,595 A | * | 3/1992 | Stella et al. .................. 24/603 |
| 5,242,144 A | | 9/1993 | Williams et al. |
| 5,618,066 A | * | 4/1997 | Fu-Hsiang .................. 292/62 |
| 5,771,742 A | * | 6/1998 | Bokaie et al. .................. 74/2 |
| 5,961,088 A | | 10/1999 | Chabanne et al. |
| 6,086,154 A | | 7/2000 | Mathey et al. |
| 6,161,892 A | | 12/2000 | Chabanne et al. |
| 6,321,654 B1 | * | 11/2001 | Robinson .................. 102/251 |
| 6,354,553 B1 | | 3/2002 | Lagerweij et al. |
| 6,488,457 B2 | | 12/2002 | Diamante |
| 6,513,868 B1 | | 2/2003 | Tame |
| 6,601,920 B1 | | 8/2003 | Magyar |
| 6,662,405 B2 | * | 12/2003 | Vitry .................. 16/355 |
| 6,682,521 B2 | | 1/2004 | Petrakis |
| 6,705,140 B1 | * | 3/2004 | Dimig et al. .................. 70/277 |
| 6,761,407 B1 | | 7/2004 | Goodbred |
| 6,786,070 B1 | * | 9/2004 | Dimig et al. .................. 70/277 |
| 6,892,995 B2 | | 5/2005 | Tame et al. |
| 6,953,910 B2 | * | 10/2005 | Kautz et al. .................. 219/201 |
| 7,293,752 B2 | * | 11/2007 | McCulloch et al. ......... 248/429 |
| 2001/0002226 A1 | | 5/2001 | Tanaka et al. |
| 2002/0079418 A1 | | 6/2002 | Tame et al. |

(Continued)

FOREIGN PATENT DOCUMENTS

DE 3539559 A1 5/1986

(Continued)

OTHER PUBLICATIONS www.shelleys.demon.co.uk/jan02fea.htm, Single Crystals Grasp With More Reach, Eureka Jan. 2002 Cover Feature Story, 6 pages.

(Continued)

*Primary Examiner*—Michael D Masinick
(74) *Attorney, Agent, or Firm*—Brooks Kushman P.C.

(57) ABSTRACT

A shape memory alloy (SMA) system suitable for use in any number of environments, including but not limited to latching and unlatching vehicle seat tracks. The system including any number of configurations to support any number of operations, including but not limited to push-push, pull-pull, push-pull, and pull-push operations.

14 Claims, 3 Drawing Sheets

U.S. PATENT DOCUMENTS

| | | |
|---|---|---|
| 2004/0074062 A1 | 4/2004 | Stanford, Jr. et al. |
| 2004/0090101 A1 | 5/2004 | Andersson et al. |
| 2004/0182983 A1 | 9/2004 | Goodbred et al. |
| 2004/0256920 A1 | 12/2004 | Gummin et al. |
| 2005/0121636 A1 | 6/2005 | Scott |
| 2005/0172462 A1 | 8/2005 | Rudduck et al. |
| 2005/0184533 A1 | 8/2005 | Hebenstreit et al. |
| 2005/0195064 A1 | 9/2005 | Biasiotto et al. |
| 2005/0273147 A1 | 12/2005 | Israel |
| 2005/0275196 A1 | 12/2005 | Zanella et al. |
| 2006/0192465 A1 * | 8/2006 | Kornbluh et al. ............ 310/800 |

FOREIGN PATENT DOCUMENTS

| | | |
|---|---|---|
| DE | 3731146 A1 | 3/1989 |
| DE | 38 22 452 A1 | 1/1990 |
| DE | 43 37 293 C1 | 12/1994 |
| DE | 43 21 720 A1 | 1/1995 |
| DE | 44 03 310 A1 | 8/1995 |
| DE | 4419350 A1 | 12/1995 |
| DE | 10062704 A1 | 7/2002 |
| DE | 10214398 A1 | 10/2003 |
| EP | 0 891 888 A1 | 1/1999 |
| EP | 1045141 A2 | 10/2000 |
| EP | 1410945 A1 | 4/2004 |
| EP | 1516773 A1 | 3/2005 |
| EP | 1645460 A1 | 4/2006 |
| EP | 1787857 A2 | 5/2007 |
| FR | 2549978 A1 | 7/1983 |
| GB | 2168810 A | 6/1986 |
| WO | 2005026592 A2 | 3/2005 |

OTHER PUBLICATIONS

Great Britain Search and Examination Report for corresponding Application No. GB0712178.3, mailed Oct. 7, 2006, 6 pages.

Office Action from German Patent Application No. 10 2007 017 261.5-34, mailed Jul. 9, 2008, 5 pages.

* cited by examiner

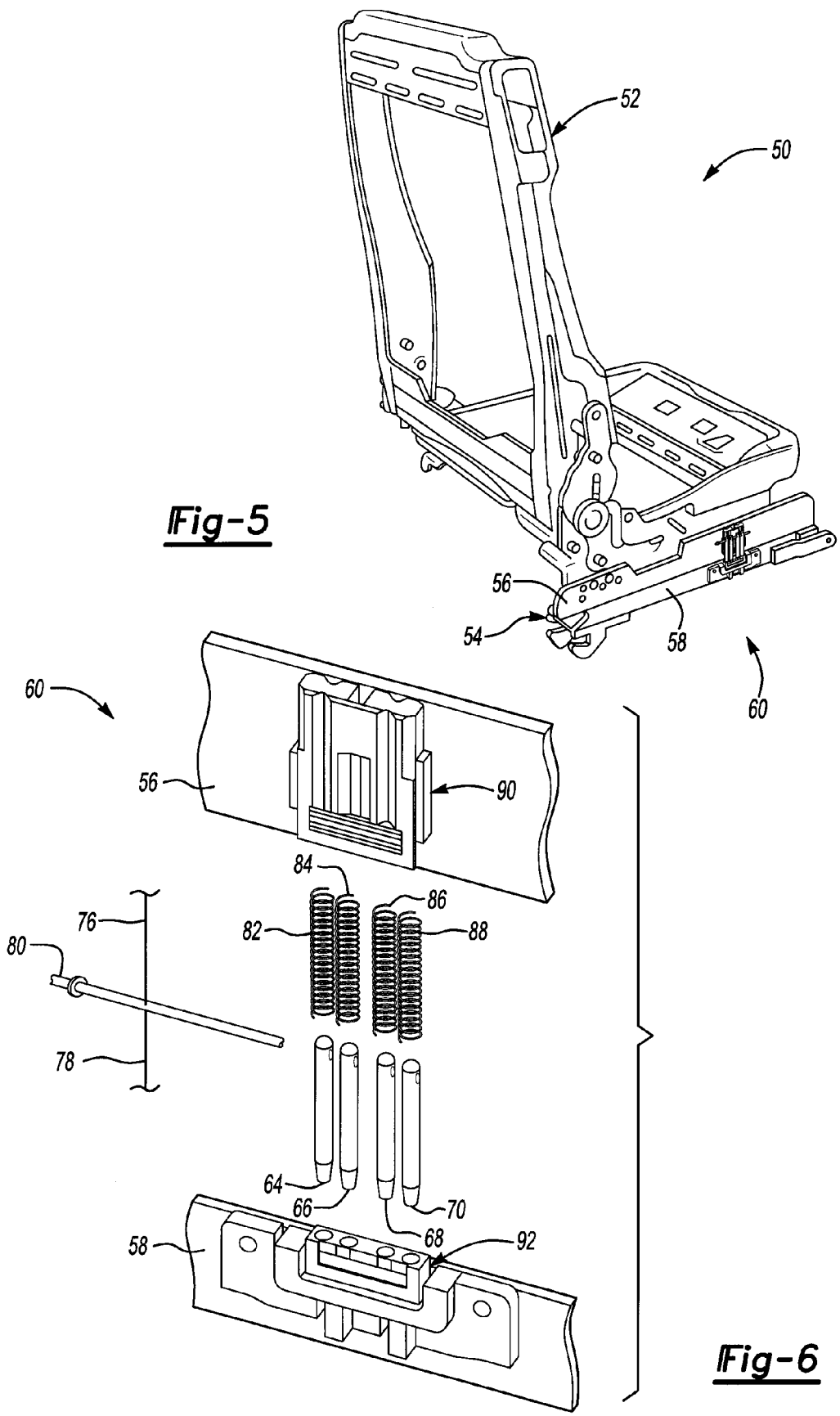

SHAPE MEMORY ALLOY (SMA) SYSTEM

BACKGROUND OF THE INVENTION

1. Field of the Invention

The present invention relates to shape memory alloy (SMA) systems of the type wherein electrical stimulation is used to excited SMA elements.

2. Background Art

Shape memory alloy (SMA) elements are electrically excitable elements that expand and/or contract as a function of temperature. The temperature, and thereby excitation, of these element may be controlled through electrical stimulation.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 5 illustrates a seating system in accordance with one non-limiting aspect of the present invention; and FIGS. 6-7 illustrate a locking mechanism in accordance with one non-limiting aspect of the present invention.

DETAILED DESCRIPTION OF THE PREFERRED EMBODIMENT(S)

Figure 1:
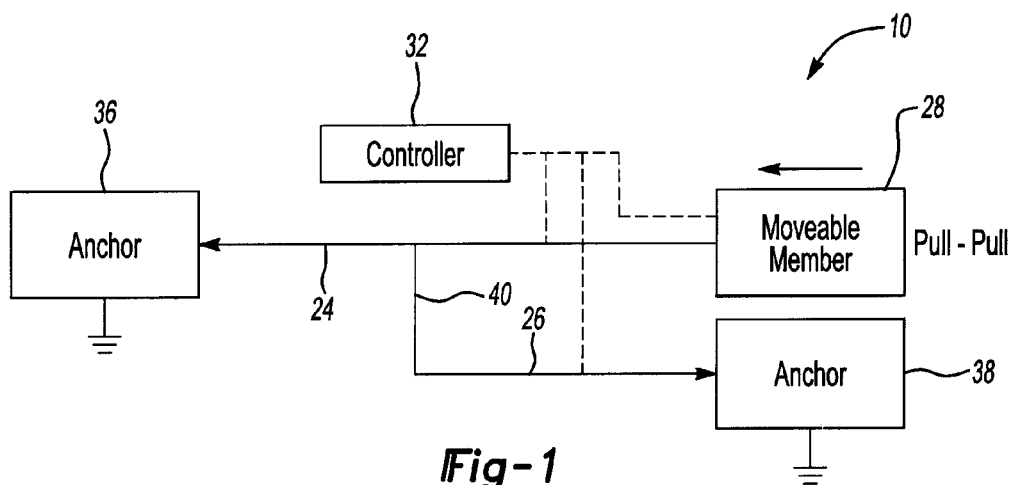
FIGS. 1-4 illustrate various shape memory alloy (SMA) systems in accordance with one non-limiting aspect of the present invention.
Figure 2:
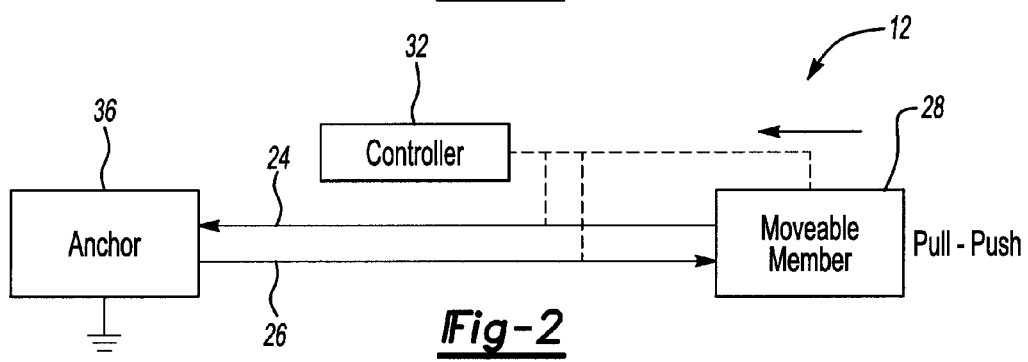
Figure 3:
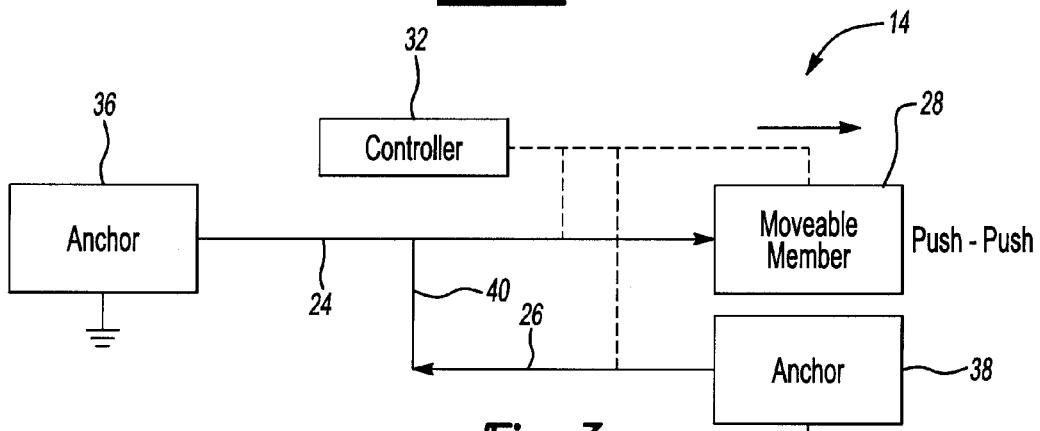
Figure 4:
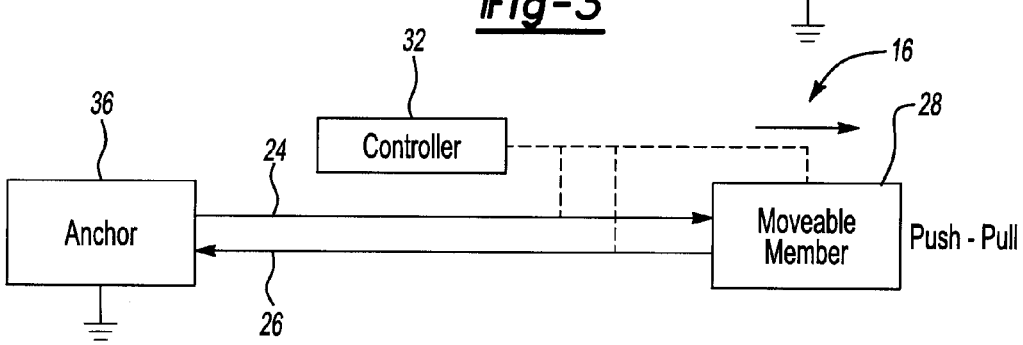

FIGS. 1-4 illustrate various shape memory alloy (SMA) systems 10-16 in accordance with one non-limiting aspect of the present invention. FIG. 1 illustrates a pull-pull system 10, FIG. 2 illustrates a pull-push system 12, FIG. 3 illustrates a push-push system 14, and FIG. 4 illustrates a push-pull system 16. In each of these systems 10-16, a first and second SMA element 24-26 is used to control movement of a moveable member 28.

A controller 32 may be included to electrically stimulate each of the SMA elements 24-26, and thereby, control the expansions and/or retraction of the same. The controller 32 may issue signals, control current flow, and/or perform any number of other operations associated with electrically controlling excitation of the SMA elements 24-26. The controller 32 can be configured to control excitation of the SMA elements 24-26 according to any number of control methodologies and parameters.

For example, in the pull-pull arrangement 10, the first SMA element 24 is excited to pull on the moveable member 28, and thereafter, the second SMA element 26 is exited to pull the first SMA element 24 back to its non-excited position. In the pull-push arrangement 12, the first SMA element 24 is excited to pull on the moveable member 28, and thereafter, the second SMA element 26 is exited to push the first SMA element 24 back to its non-excited position. In the push-push arrangement 14, the first SMA element 24 is excited to push on the moveable member 28, and thereafter, the second SMA element 26 is exited to push the first SMA element 24 back to its non-excited position. In the push-pull arrangement 16, the first SMA element 24 is excited to push on the moveable member 28, and thereafter, the second SMA element 26 is exited to pull the first SMA element 24 back to its non-excited position.

In addition, the controller 32 can be configured to control speed, positioning, and other characteristics associated with excitation of the SMA elements 24-26. For example, the controller 32 may excite the first SMA element 24 and thereafter, while the first SMA element 24 is still excited, excite the second SMA element 26 in order to control or fine-tune movement of the first SMA element 24. Likewise, the controller 32 may individually control and/or vary current flow and other operating conditions associated with heating or otherwise controlling excitation of the SMA elements 24-26 so that the speed of excitation can be controlled and limited.

The size, material properties, and other features of the SMA elements 24-26 may be selected to correspond with the desired operation of the same. For example, if the second SMA element 24-26 is used to control positioning of the first SMA element 24, the sizing or other strength features of the second SMA 26 may be selected so that it can overcome the forces of the first SMA element 24 when both SMA elements 24-26 are excited and/or to absorb forces associated with the operation of the other. Likewise, the size or other feature associated with movement speed may be selected to correspond with desired operating characteristics, i.e., the first SMA 24 may be of a small size than the second SMA 26 if it is desirable to move the second SMA 26 at a greater speed.

Each of the systems may include one or more anchors 36-38 against which the SMA elements 24-26 may operate in order to perform the push and pull operations described above. The anchors 36-38 are shown to be separate from the moveable member 28 for exemplary purposes, but the present invention is not intended to be so limited. The anchors 36-38, depending on the environment of use, may be associated with any structure or element having sufficient capabilities to facilitate the desired movement of the SMA element(s) 24-26 connected thereto.

The anchors 36-38, or other element attached to the SMA elements 24-26, may be used as an electrical ground for the SMA elements 24-26. The electrical grounds sink current used to excite the SMA elements 24-26. In this manner, the controller 32 may be used to provide electrical stimulation to the SMA elements 24-26, which may then be sunk by the anchors 36-38. The anchors 36-38 are generally illustrate with electrical ground, however, the anchors 36-38 need not necessarily sink current to true ground, rather the anchors 36-38 may simply provide a current path between the controller 32 and SMA elements 24-26 so as to provide a means for exciting the SMA elements 24-26.

The controller 32 is shown to be separate from the elements 24-26, anchors 36-38, and moveable member 28. The present invention, however, is not intended to be so limit and fully contemplates the controller 32 or multiple controllers being integrated with the moveable member 28 and/or anchors 36-38 so as to control electrical stimulation of the SMA elements 24-26 and to monitor other operating parameters of the same.

As shown in FIGS. 1 and 3, a connecting member 40 may be provided between the first and second SMA elements 24-26. The connecting member 40 may be configured to exert a force of the SMA elements 24-26 in proportion to the movement of the same. For example and with respect to FIG. 1, when the first SMA element 24 pulls on the moveable member 28, the connecting member 40 moves leftward to pull on the second SMA element 26. Once movement of the first SMA element 24 ceases and contraction of the second SMA element begins 26, the connecting member 40 moves rightward to pull on the firs SMA element 24.

The moveable member 28 shown in FIGS. 1-4 may be associated with any member that can be moved with an SMA element. In accordance with one non-limiting aspect of the present invention, the moveable member may correspond with an electrically actuatable locking mechanism of a vehicle seating system.

FIG. 5 illustrates a seating system 50 having an electrically securable vehicle seat 52 in accordance with one non-limiting aspect of the present invention. The vehicle seating system 50 may include the vehicle seat 52 being moveable relative to a track assembly 54. The track assembly 54 may include a first and second track 56-58 with the second track 58 being movable relative to the first track 56 in order to secure positioning if the seat 52 relative to the second track 58.

An electrically operable locking mechanism 60 may be used in cooperation with the seat track assembly 54 to inhibit movement of the second track 58 relative to the first track 56. The locking mechanism 60 may include multiple triggers 64-70 that are electrically moveable between a locked position in which the triggers are engaged with the second track 58 and an unlocked position in which the triggers are disengaged from the second track 58.

When the triggers 64-70 are engaged, the position of the seat 52 with respect to the second track 58 is secured, and when the trigger 64-70 are disengaged, the positioning of the seat 52 with respect to the second track 58 is free such that the seat 52 may be positioned with respect to the same.

Figure 7:
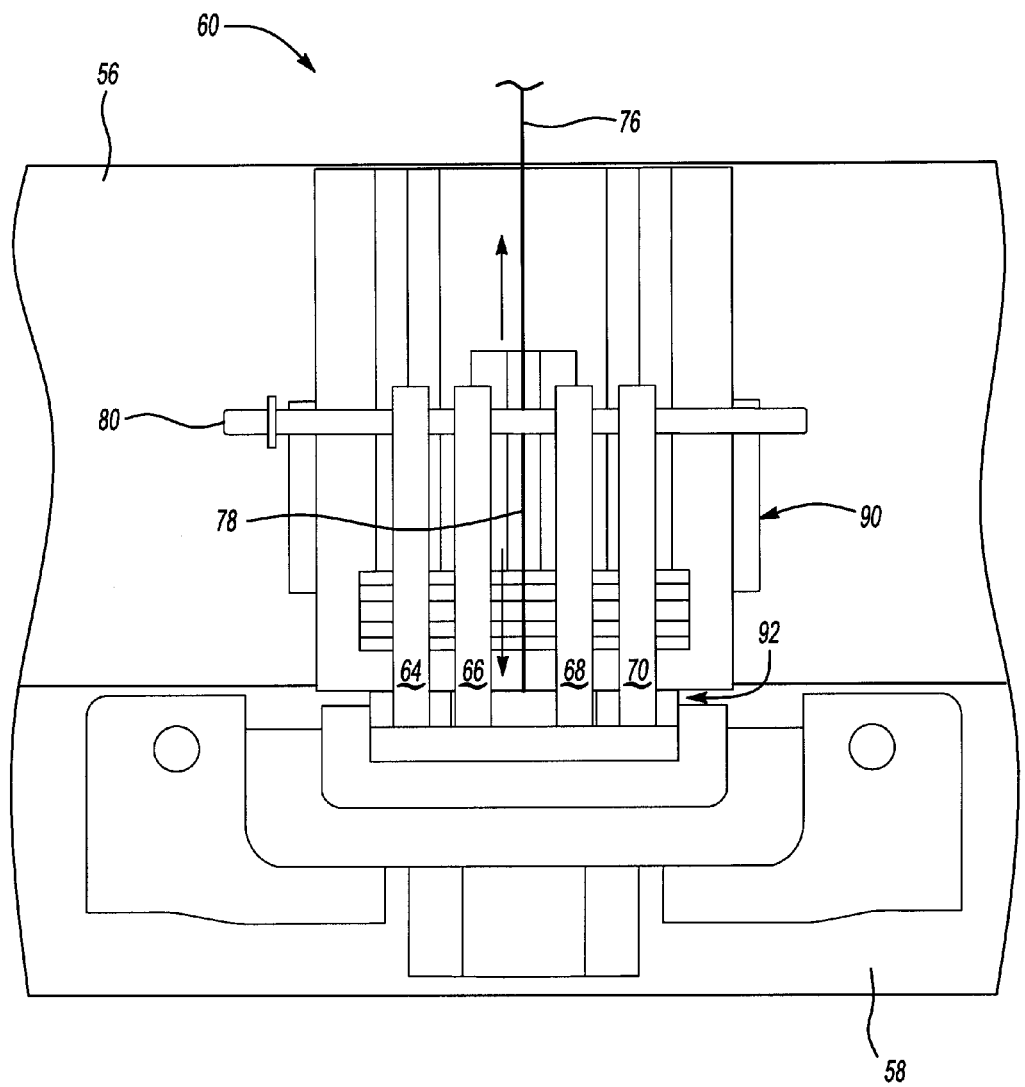

FIGS. 6-7 illustrate the locking mechanism 60 in more detail and in accordance with one non-limiting aspect of the present invention. The locking mechanism 60 may include a first SMA element 76, second SMA element 78, the number of pins (triggers) 64-70, cross-bar 80, springs 82-88, top portion 90, and bottom portion 92. The pins 64-70 may extend through the bottom portion 92 and into apertures of the first track 56 when the locking mechanism 60 is engaged and the pins 64-70 may be removed from the apertures and into the top portion 90 when the locking mechanism 60 is disengaged such that the second track 58 is free to move relative to the first track 56.

The bottom portion 92 may be include within the first track 56 to ride along a top side of the second track 58. The top portion 90 may be connected to the first track 56 so as to provide a cartridge arrangement that that allows the pins 64-70 to move between engaging or disengaging the first track 56 with the second track 58.

A controller (not shown) may communicate with the locking mechanism 60 to control excitation of the SMA elements 76-78. In more detail, the SMA members 76-78 may be arranged in a pull-pull manner such that the first SMA member 76 pulls on the cross-bar 80 to remove the pins 64-70 from the apertures and the second SMA 78 pulls on the retracted cross-bar 80 to insert the pins 64-70 within the apertures. This allows the controller to selectively excite the SMA elements 76-78, and thereby, control engagement and disengagement of the locking mechanism 60.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat track assembly for adjusting a seat assembly of a vehicle, the seat track assembly comprising:
   a first track;
   a second track that is moveable with respect to the first track;
   an electrically operable latch mechanism associated with the second track and being operative to inhibit relative movement of the tracks, the latch mechanism including multiple triggers that are electrically driven between each of a locked position and an unlocked position, wherein the locked position corresponds with the triggers engaging with the first track and the unlocked position corresponds with the triggers disengaging from the first track;
   at least one shape memory alloy (SMA) element, the SMA element configured to facilitate electrically engaging and disengaging the triggers;
   a controller for electrically controlling movement of the SMA elements, and thereby, movement of the triggers;
   wherein the controller is configured to control excitation of the SMA elements through electrical stimulation;
   wherein the controller is configured to limit excitation of the SMA elements as a function of temperatures of the elements; and
   wherein the assembly includes at least a first and second SMA element and the controller is configured to excite the second SMA element during excitation of the first SMA element so as to fine-tune movement of the first SMA element.

2. The seat track assembly of claim 1 wherein the first SMA element associated with electrically disengaging the triggers and the second SMA element associated with electrically engaging the triggers.

3. The seat track assembly of claim 1 wherein each SMA element is arranged such that the excitation of the same produces a push-pull, push-push, pull-push, or pull-pull operation.

4. The seat track assembly of claim 1 wherein the triggers are pins that are moveable with movement of a cross-bar member connected thereto, the cross-bar member connected to each of the first and second SMA elements.

5. The seat track assembly of claim 4 wherein the triggers remain engaged or disengaged until being moved by one of the first or second SMA elements.

6. A seat track assembly for adjusting a seat assembly of a vehicle, the seat track assembly comprising:
   a first track;
   a second track that is moveable with respect to the first track;
   an electrically operable latch mechanism associated with the second track and being operative to inhibit relative movement of the tracks, the latch mechanism including multiple triggers that are moveable between a locked position in which the triggers are engaged with the first track and an unlocked position in which the triggers are disengaged from the first track;
   at least one shape memory alloy (SMA) element, the SMA element configured to facilitate electrically engaging and disengaging the triggers;
   a controller for electrically controlling movement of the SMA elements, and thereby, movement of the triggers; and wherein the assembly includes at least a first and second SMA element and the controller is configured to excite the second SMA element during excitation of the first SMA element so as to fine-tune movement of the first SMA element.

7. The seat track assembly of claim 6 wherein the controller is configured to control excitation of the SMA element through electrical stimulation.

8. The seat track assembly of claim 6 wherein the controller is configured to limit excitation of the SMA element as a function of temperatures of the elements.

9. A seat track assembly comprising:
a first track;
a second track that is moveable relative to the first track;
a latch mechanism attached the second track, the latch mechanism being operable between a locked positioned and an unlocked position, the locked position preventing movement of the second track with at least one pin being journaled within at least one aperture in the first track, the unlocked position allowing movement of the second track with the at least one pin being removed from the at least one aperture;
a first shape memory alloy (SMA) element configured to move the at least one pin from the locked position to the unlocked position when a first current is received;
a second SMA element configured to moved the at least one pin from the unlocked position to the locked position when a second current is received; and
a controller configured to provide the first and second currents to the first and second SMA elements, wherein the controller continuously provides the second current to the second SMA element to force movement of the at least one pin to the locked position in the absence of the first current being received by the first SMA element.

10. The seat track assembly of claim 9 wherein the at least one pin is unable to move from the unlocked position to the locked position without the second SMA element receiving the second current.

11. The seat track assembly of claim 9 wherein the at least one pin is unable to move from the locked position to the unlocked position without the first SMA element receiving the first current.

12. The seat track assembly of claim 9 wherein first and second SMA elements are approximately the same size and the first current is provided to be greater than the second current in order to overcome the movement caused by the continuous application of the second current.

13. The seat track assembly of claim 9 wherein the first SMA element contracts to a shorter length upon receipt of the first current and the second SMA elements contracts to a shorter length upon receipt of the second current.

14. The seat track assembly of claim 13 wherein the SMA elements remain contracted when the first or second current is removed or when a greater current is applied unless acted on by another force.

* * * * *

UNITED STATES PATENT AND TRADEMARK OFFICE
CERTIFICATE OF CORRECTION

PATENT NO. : 7,581,706 B2  Page 1 of 1
APPLICATION NO. : 11/426384
DATED : September 1, 2009
INVENTOR(S) : Kennedy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 422 days.

Signed and Sealed this

Fourteenth Day of September, 2010

David J. Kappos
*Director of the United States Patent and Trademark Office*